(No Model.)
R. C. BIRD & D. A. PAGE.
BED BOTTOM.
No. 451,908. Patented May 12, 1891.
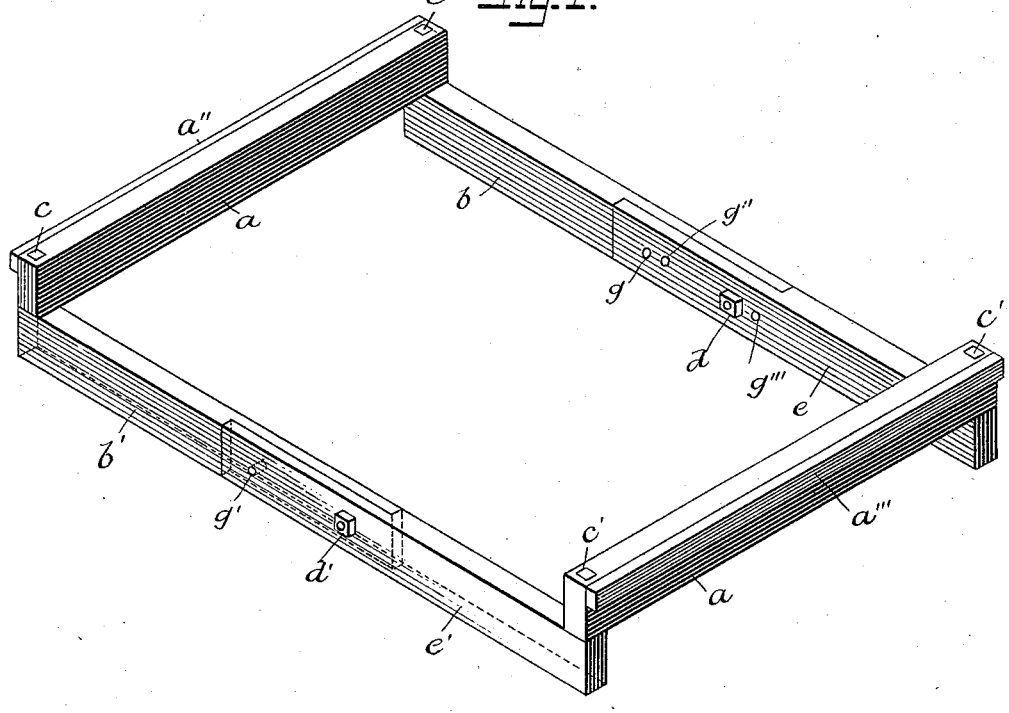
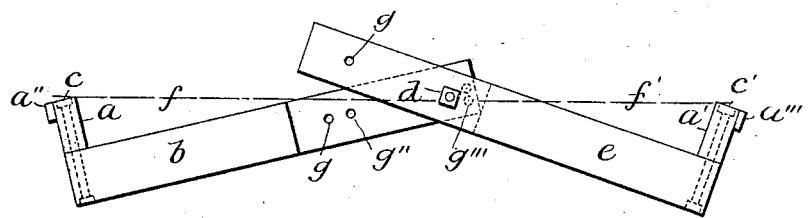
WITNESSES
H. S. McArthur
J. A. Watson
INVENTOR
R. C. Bird and D. A. Page
by Foster & Freeman
Attorneys

UNITED STATES PATENT OFFICE.

RICHARD C. BIRD AND DUSTAN A. PAGE, OF CHICAGO, ILLINOIS.

BED-BOTTOM.

SPECIFICATION forming part of Letters Patent No. 451,908, dated May 12, 1891.

Application filed February 10, 1890. Serial No. 339,940. (No model.)

*To all whom it may concern:*

Be it known that we, RICHARD C. BIRD and DUSTAN A. PAGE, citizens of the United States, residing at Chicago, in the county of Cook and State of Illinois, have invented certain new and useful Improvements in Bed Bottoms, of which the following is a specification, to wit:

Our invention relates to improvements in bed-bottoms; and it consists in the particular construction, arrangement, and operation of the same, as will be hereinafter fully described, and pointed out in the claim.

To enable others skilled in the art to which our invention appertains to make and use the same, we will now proceed to describe our improvement, referring to the accompanying drawings, in which—

Figure 1 is an isometric perspective view of our invention, and Fig. 2 is a side view.

Similar letters refer to similar parts throughout both views.

Our invention relates to that class of bed-bottoms in which the bed-bottom is of wire-cloth, canvas, rope, or other elastic or springy material, which is stretched to the proper tension. We construct our bed-bottom by making the side rails in halves or parts and hinging or pivoting said parts together, so as to form a toggle or secure a spreading movement, as will be clearly understood from the drawings, in which $a$ and $a'$ are the end rails of the bed-frame, which are secured to the side rails $b\ e\ b'\ e'$ by the bolts $c\ c\ c'\ c'$, or in any other suitable manner. Each of the side rails is made in halves or sections $b\ e$ and $b'\ e'$, the outer ends of each half being secured to the end rails $a\ a'$ by said bolts $c\ c'$, and at their inner ends or connection pivoted or hinged together by the bolts $d$ and $d'$, or in any other suitable manner, to form a toggle-joint and secure a spreading movement.

$g$ and $g'$ are retaining-pins, which pass through or are inserted in suitable holes in the side rails at their halves, and are for the purpose of holding the respective halves of the side rails in a locked position after the material has been stretched, and the bed-bottom is ready for use. We prefer to use the holes and pins, but any other locking or retaining device accomplishing the same purpose may be used without departing from our invention.

$g''$ and $g'''$ are extra pin-holes for a purpose presently explained.

$f$ (shown in dotted lines in Fig. 2) is the wire-cloth or other material forming the bed-bottom. Its ends are passed over and down the outside of the end rails $a\ a'$ and tacked thereto, then covered by the cleats or strips $a''\ a'''$ so as to be firmly secured, as will be readily understood from the drawings. The particular construction of the side rails in halves and turning on the bolts form a toggle-joint, and a spreading movement is secured, so that the wire-cloth or other material will be readily stretched.

While we prefer the particular form of halving the side rails, as shown, it is evident that the toggle-joint and spreading movement may be obtained without halving, but by overlapping the ends of the two parts of each side rail, or in any other suitable manner to obtain the toggle-joint and spreading movement.

We prefer to make the bed-frame of wood, but the same may be made of metal or any other suitable material.

The bed is set up as follows: The frame is bolted together with the pins $g$ and $g'$ in their respective holes, as shown in Fig. 1. The side rails are then lifted by removing the pins $g$ and $g'$, as shown in Fig. 2. The cloth or material $f$ is then tacked on the end rails $a\ a'$, and then covered by the strips $a''\ a'''$. The side rails are then pressed down from the position as shown in Fig. 2 to the position in line as shown in Fig. 1. This pressing down gives said rails a spreading movement stretching the cloth $f$. When the side rails are in line the pins are inserted and the bed is ready for use. In the event of the wire-cloth or material $f$ becoming slack from use the slack can be readily taken up by means of the extra pin-holes $g''\ g'''$. When it is desired to take down the bed-bottom for shipment, storage, or otherwise, the pins $g$ and $g'$ and bolts $d$ and $d'$ are removed and the side rails swung around upon the bolts $c\ c'$ to a position under the end rails, and the bed can then be rolled up into a small space, thereby reducing the cost of shipment and of storage.

It is evident that our improvement is applicable to any-sized bed-bottom, cot, single or double bed.

We are aware that it is not new to construct bed-bottoms which may be folded up—such, for instance, as that shown in patent to Bedell, No. 334,556, dated January 19, 1886—and therefore we do not claim this feature broadly. we are also aware of the cot-bed patented to Nichols, No. 237,306, dated February 1, 1881, in which the end rails are divided, but Nichols's construction does not permit his bed to be folded into a package less than six or seven feet long, while by our improvements a bed can be packed in much less space.

What we do claim, and desire to secure by Letters Patent, is—

In a folding bed, a flexible bottom, an end rail secured to each end of said bottom, side rails each formed in separable sections, one section pivoted to each end of each one of said end rails to swing to positions parallel to or at right angles to said end rail and in the latter position overlapping the end of the opposite section, a pivot-pin for connecting the overlapping ends, and a second stop-pin for limiting the swing of the sections on said pivot, all substantially as described.

In testimony whereof we affix our signatures in presence of two witnesses.

RICHARD C. BIRD.
DUSTAN A. PAGE.

Witnesses:
CHARLES M. STEPHENS,
CHAS. FINNELL.